April 24, 1928.
E. G. BURNS
UNIVERSAL JOINT
Filed Dec. 14, 1925
1,667,455
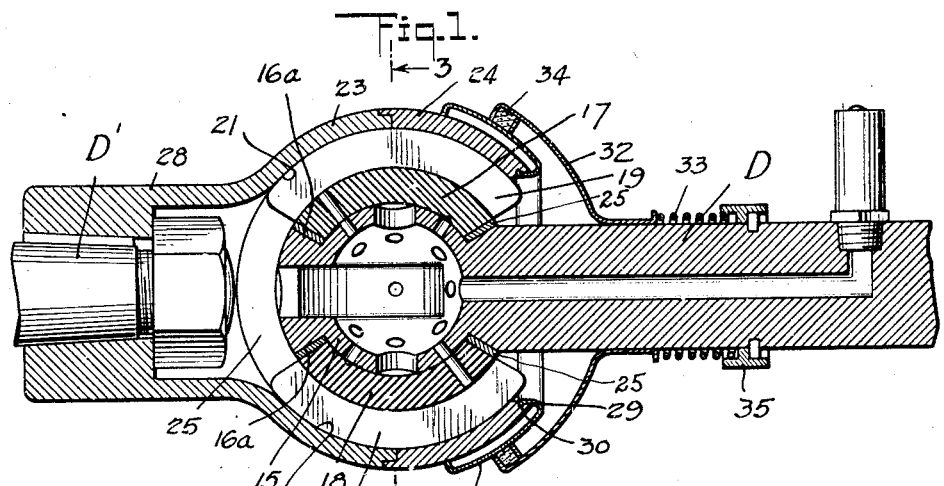
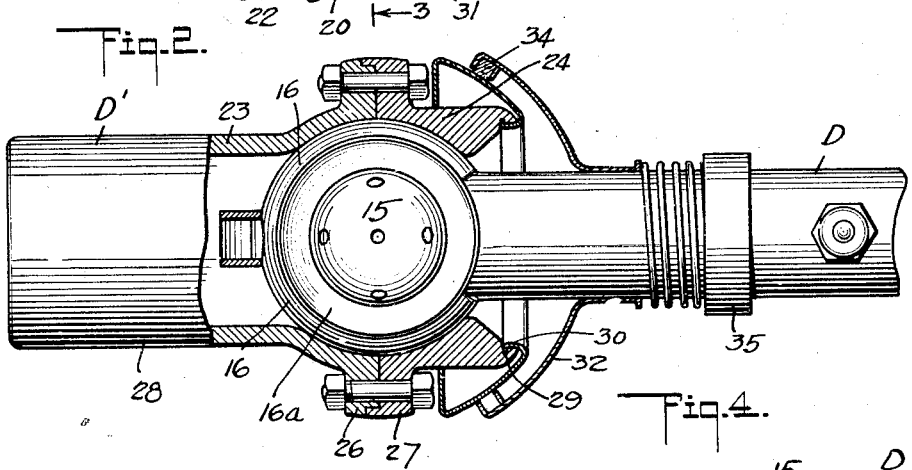
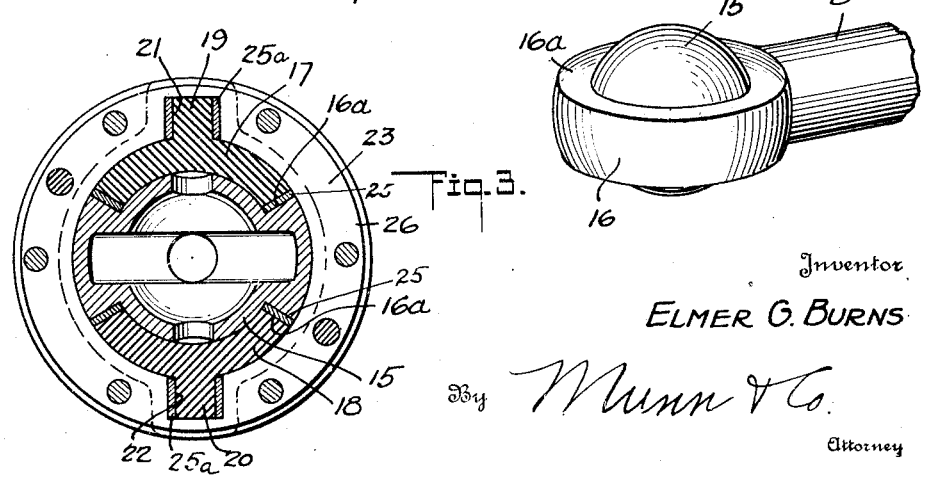
Inventor
ELMER G. BURNS
By Munn & Co.
Attorney Patented Apr. 24, 1928.

1,667,455

UNITED STATES PATENT OFFICE.

ELMER G. BURNS, OF LOS ANGELES, CALIFORNIA.

UNIVERSAL JOINT.

Application filed December 14, 1925. Serial No. 75,426.

My invention relates to universal joints of the character embodied in my co-pending application Serial No. 14,510, filed March 10, 1925, and it has particular reference to certain improvements therein by which the parts thereof, when in use, will not be subjected to undue strains and stresses, but are so correlated as to render them immovable circumferentially one with respect to the other, whereby any tendency of the parts to move radially or circumferentially or in any manner to set up undue wear and stress is entirely eliminated.

I will describe only one form of universal joint embodying my invention, and will then point out the novel features thereof in claims.

In the drawings

Figure 1 is a view showing in longitudinal section one form of universal joint embodying my invention;

Figure 2 is a sectional view taken at right angles to Figure 1;

Figure 3 is a transverse vertical sectional view taken on the line 3—3 of Figure 1;

Figure 4 is a detail perspective view showing the ball member of the joint shown in the preceding views.

Similar reference characters refer to similar parts in each of the views.

Referring to the drawings, my invention in its present embodiment is shown as comprising a driven shaft D having formed on its free end a hollow ball member 15 provided on its outer side with a substantially annular flange 16 extending circumferentially of the ball and with its ends terminating at diametrically opposed points with respect to the shaft D. As clearly shown in Figure 4, this flange 16 is provided with inwardly inclined upper and lower edges 16$^a$ so that in cross section, as shown in Figure 3, the flange appears of dove-tail form. Embracing the ball member 15 is a two-part spherical socket member comprising sections 17 and 18, each of which is formed with an arcuate flange 19 and 20, respectively, these flanges being adapted to have sliding fit within grooves 21 and 22 of the housed semispherical sections 23 and 24 of a two-part casing. Washers 25 are interposed between the sections 17 and 18 of the socket member and the flange 16 and other washers 25$^a$ are interposed between the flanges 19 and 20 of the socket members and the housing to prevent undue wear of the confronting surfaces of these members, and it is to be particularly noted that the edges of sections 17 and 18 are parallel to the edges 16$^a$ of the flanges 16 and that all of the edges are in planes at right angles to a circle defining the circumference of the socket member.

The sections 23 and 24 of the two-part housing are formed with annular connecting flanges 26 and 27 which are secured together as illustrated, and in a manner to maintain the sections of the housing in spherical formation. The housing section 23 is provided with an extension 28 to which is operatively connected a driving shaft D′. The housing section 24 is formed with an opening, the wall of which is provided with an annular groove 29 in which seats a lip 30 of a collar 31 whereby the collar is fixedly secured upon the housing section 24. A hood 32 is slidable upon the shaft D and is urged in the direction of the collar 31 by a spring 33 so that a dust-insulating strip 34 is held in contact with the outer surface of the collar 31 and to thereby provide a dust-tight joint between the hood and collar. It will be understood that the collar and hood co-operate in providing a covering for the opening of the housing section 24 to prevent the passage of dust inwardly of the joint. The spring 33 is interposed between the hood 32 and a collar 35 secured to the shaft D. The joint operates in the same manner as that described in connection with the form of joint embodied in my co-pending application herein referred to, with the exception that the flange 16 of the ball member 15, by virtue of its inwardly inclined edges 16$^a$ prevents any tendency of the sections of the socket member or the ball member from moving radially under the torque generated as a result of the rotational movement of the two shafts. As previously described, the edges of the socket sections and the edges of the flange 16 are at right angles to a circle describing the circumference of the ball or socket member and hence at right angles to the torque exerted at the joint, wherefore it will be seen that force exerted circumferentially on either the ball member or socket member will be effectively resisted by the edges of such members and to the extent that no circumferential movement between the two members is permitted.

In this manner undue stresses and strains to which the parts of the joints in previous constructions are subjected is entirely eliminated, thereby reducing excessive wear and lessening the liability of the parts of the joint being broken.

Although I have herein shown and described only one form of universal joint embodying my invention, it is to be understood that various changes and modifications may be made therein without departing from the spirit of the invention, and the spirit and scope of the appended claims.

I claim:

1. A universal joint comprising a ball member, a socket member, a housing for the members, shafts respectively secured to the ball member and housing provided with an opening through which the shaft for the member extends, the wall of said opening being provided with a groove, and a closure for the opening comprising a member having a lip engaging within the groove, and a second member on the ball member shaft having sliding engagement with the lipped member.

2. A universal joint comprising a shaft, a flanged ball formed on one end of the shaft, a two-part socket rotatably receiving the ball, and embracing the flange of the ball, the contacting surfaces of the flange and socket being disposed at right angles to any circumferential force exerted on the joint, the parts of the socket each provided exteriorly with a flange which coacts to produce a continuous flange at right angles to the ball flange, and a housing having grooves for receiving the flange of the socket.

3. A universal joint comprising a shaft, an annular flange fixed to the shaft, a two part socket between the parts of which the flange is received, said flange being of dovetail form in cross section and the contacting edges of the socket being formed to have contiguous engagement with the divergent faces of the flange, the parts of the socket each provided with a flange which coact to produce a continuous flange at right angles to the first flange, and a housing having grooves for receiving the flange of the socket.

4. A universal joint as embodied in claim 3 wherein washers are interposed between the flange of the shaft and the parts of the socket and between the socket flange and housing.

5. A ball member for universal joints comprising a driven shaft having an annular portion at one end, said portion provided at its respective sides with annular flared faces, and a pair of identical sections between which said annular portion is directly interposed, said sections each having an annular flared face nested with the corresponding adjacent annular flared face of said portion and coacting therewith to cause said section to resist the action of frictional stress applied thereto, and annular flanges formed on said sections to engage in the grooves of a housing or socket member.

6. A universal joint comprising a shaft, a member on one end of the shaft having an annular portion, a two-part socket receiving the member and engaging the opposed sides of the annular portion, the contacting surfaces of the annular portion and socket being radially disposed with respect to the axis of the socket, and annular flanges formed on the parts of the socket for engagement with the grooves of a housing.

ELMER G. BURNS.